United States Patent
Kalyanasundharam et al.

(10) Patent No.: US 7,882,327 B2
(45) Date of Patent: Feb. 1, 2011

(54) COMMUNICATING BETWEEN PARTITIONS IN A STATICALLY PARTITIONED MULTIPROCESSING SYSTEM

(75) Inventors: Vydhyanathan Kalyanasundharam, San Jose, CA (US); William A. Hughes, San Jose, CA (US); Patrick Conway, Los Altos, CA (US); Jeffrey Dwork, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 655 days.

(21) Appl. No.: 11/831,102

(22) Filed: Jul. 31, 2007

(65) Prior Publication Data

US 2009/0037688 A1 Feb. 5, 2009

(51) Int. Cl.
*G06F 12/02* (2006.01)
(52) U.S. Cl. .................... 711/202; 711/173
(58) Field of Classification Search .......... None
See application file for complete search history.

(56) References Cited

U.S. PATENT DOCUMENTS 6,049,808 A * 4/2000 Talluri et al. ............. 707/201
6,853,382 B1 2/2005 Van Dyke et al.
2002/0184345 A1* 12/2002 Masuyama et al. ......... 709/220
2003/0131213 A1* 7/2003 Shanahan et al. .......... 711/203
2003/0233495 A1* 12/2003 Moll et al. ................ 710/1
2004/0054807 A1* 3/2004 Harvey et al. ............. 709/243
2004/0249970 A1* 12/2004 Castro et al. .............. 709/238

* cited by examiner

*Primary Examiner*—Than Nguyen
(74) *Attorney, Agent, or Firm*—Lawrence J. Merkel; Meyertons, Hood, Kivlin, Kowert & Goetzel, P.C.

(57) ABSTRACT

In one embodiment, a method comprises assigning a unique node number to each of a first plurality of nodes in a first partition of a system and a second plurality of nodes in a second partition of the system. A first memory address space spans first memory included in the first partition and a second memory address space spans second memory included in the second partition. The first memory address space and the second memory address space are generally logically distinct. The method further comprises programming a first address map in the first partition to map the first memory address space to node numbers, wherein the programming comprises mapping a first memory address range within the first memory address space to a first node number assigned to a first node of the second plurality of nodes in the second partition, whereby the first memory address range is mapped to the second partition.

19 Claims, 4 Drawing Sheets

COMMUNICATING BETWEEN PARTITIONS IN A STATICALLY PARTITIONED MULTIPROCESSING SYSTEM

BACKGROUND

1. Field of the Invention

This invention is related to the field of multiprocessor computer systems, and more particularly to communicating between partitions in such systems.

2. Description of the Related Art

Multiprocessing computer systems include two or more processors connected in some fashion to a memory system and one or more input/output (I/O) devices or peripheral devices. The systems may be designed according to several topologies. One topology is a distributed shared memory system in which a set of nodes, each of which includes at least one processor and a portion of the system memory, are interconnected. A given node is the home node of the system memory included in that node. The memory address space of the system spans the nodes, and thus a given memory address can be mapped to a given node. Typically, such systems are designed to map the entire memory address range across the nodes, up to a predetermined maximum number of nodes.

SUMMARY

In one embodiment, a method comprises assigning a unique node number to each of a first plurality of nodes in a first partition of a system and a second plurality of nodes in a second partition of the system. A first memory address space spans first memory included in the first partition and a second memory address space spans second memory included in the second partition. The first memory address space and the second memory address space are generally logically distinct. The method further comprises programming a first address map in the first partition to map the first memory address space to node numbers, wherein the programming comprises mapping a first memory address range within the first memory address space to a first node number assigned to a first node of the second plurality of nodes in the second partition, whereby the first memory address range is mapped to the second partition. A computer accessible medium comprising instructions which, when executed, implement the method is contemplated as well.

In an embodiment, a system comprises a first partition and a second partition. The first partition comprises a first plurality of nodes and first memory, wherein a first memory address space spans first memory included in the first partition. The second partition comprises a second plurality of nodes and second memory, wherein a second memory address space spans second memory included in the second partition, and wherein the first memory address space and the second memory address space are generally logically distinct. Each of the first plurality of nodes and the second plurality of nodes are assigned unique node numbers during use. The first partition includes a first address map to map the first memory address space to node numbers, wherein the first address map is programmable to map a first memory address range within the first memory address space to a first node number assigned to a first node of the second plurality of nodes in the second partition, whereby the first memory address range is mapped to the second partition.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
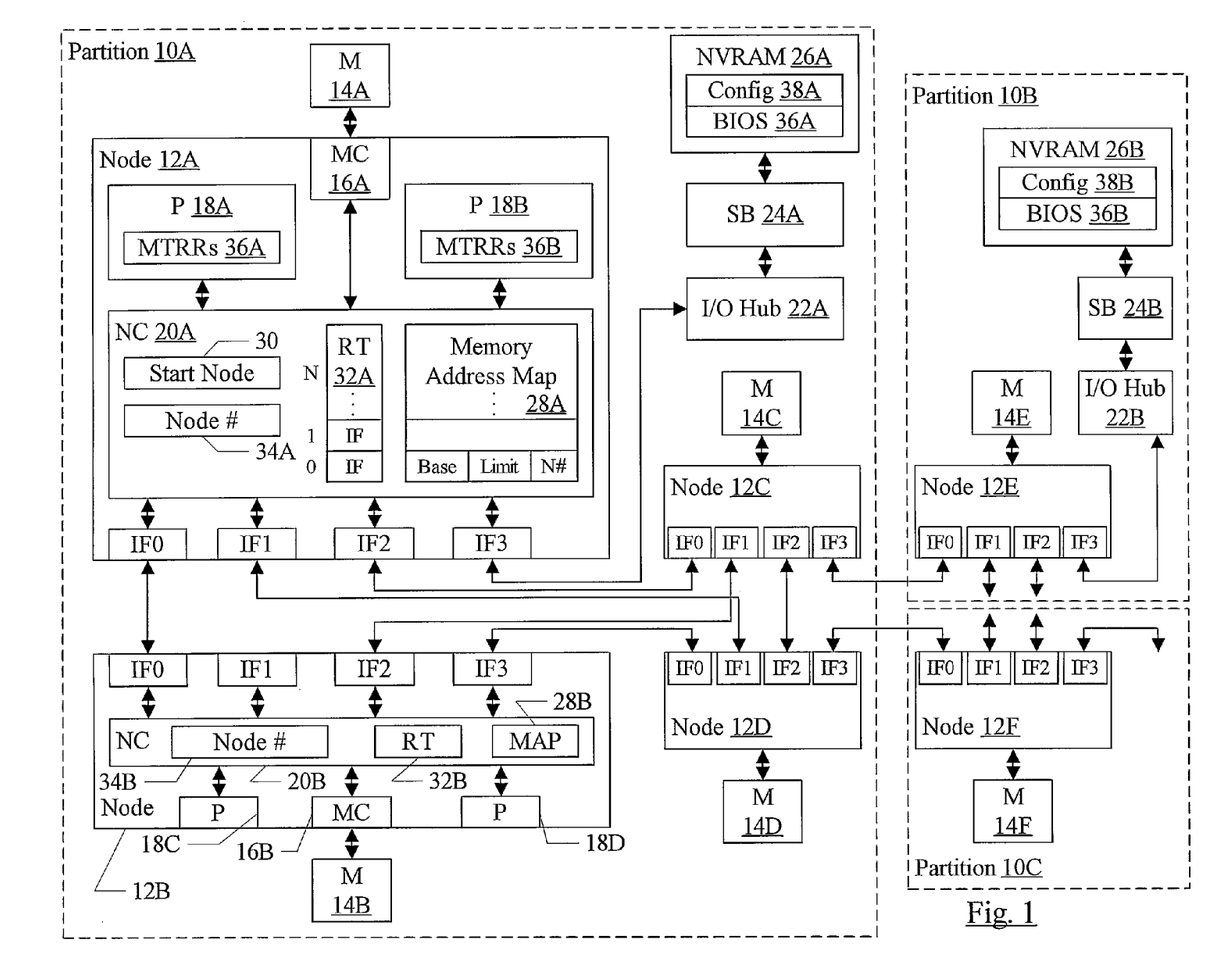
FIG. 1 is a block diagram of one embodiment of a system including multiple partitions.

Turning now to FIG. 1, a block diagram of a system comprising a plurality of partitions 10A-10C is shown. Each partition 10A-10C comprises at least one node, and may comprise a plurality of nodes. For example, the partition 10A comprises nodes 12A-12D. The partition 10B may comprise a plurality of nodes, including node 12E shown in FIG. 1. The partition 10C may similarly comprise a plurality of nodes, including node 12F shown in FIG. 1. Each node 12A-12F may be coupled to corresponding memory 14A-14F, as shown in FIG. 1. Specifically, each node 12A-12F may include a memory controller (e.g. the memory controller 16A shown in the node 12A and the memory controller 16B shown in the node 12B) to communicate with the attached memory 14A-14F. The nodes 12A-12F may further comprise one or more processors (e.g. the processors 18A-18B in the node 12A and the processors 18C-18D in the node 12B), and may further comprise a node controller (e.g. the node controller 20A in the node 12A and the node controller 20B in the node 12B). The memory controller and the processors in each node 12A-12F may be coupled to the node controller in that node 12A-12F. Additionally, each node 12A-12F includes a plurality of interface circuits (e.g. four interface circuits IF0 to IF3 per node in FIG. 1). The interface circuits are coupled to the node controller in the same node, and are also coupled to links to other nodes. Most of the links couple interface circuits to interface circuits of other nodes in the same partition (or to I/O or peripheral devices in the same partition, such as IF3 of the node 12A coupled to the I/O hub 22A). An example interconnection of the nodes 12A-12D is shown in FIG. 1, but any interconnection may be used and not every node need be connected to every other node of a partition. Interconnection between nodes in other partitions 10B-10C may be similar, or may differ, in various embodiments. The link from IF3 of the node 12C is coupled to IF0 of the node 12E in the partition 10B, and the link from IF3 of node 12D is coupled to IF0 of the node 12F in the partition 10C. In general, any interface circuit may be coupled to any interface circuit of another node, including another node in another partition, or an I/O or peripheral device. In the illustrated embodiment, the I/O hub 22A is coupled to a south bridge 24A, which is further coupled to a non-volatile memory (e.g. NVRAM) 26A. Similarly, an I/O hub 24B in the partition 10B is coupled to a south bridge 24B, which is couple to an NVRAM 26B. IF3 of the node 12E is coupled to the I/O hub 22B as well. While nodes are shown in varying levels of detail in FIG. 1 for simplicity in the drawing, each node 12A-12F may be generally similar to node 12A.

The memory in each partition 10A-10C may be addressed using addresses in a memory address space. That is, each memory location in the memory of a given partition is identified by a unique address in the memory address space of that partition. Thus, for example, the memories 14A-14D may collectively form a distributed memory that is addressed using the memory address space for partition 10A. Devices in the partition 10A, such as processors 18A-18D and/or peripheral devices (through the I/O hub 22A or other I/O connections), may generate addresses in the memory address space to access (read/write) the data stored in the addressed memory location(s). Other address spaces may be supported in a partition as well, such as an I/O address space to address various peripheral and I/O devices (as well as other I/O circuitry such as the I/O hub 22A). Thus, a memory address space may generally comprise the addresses that are mapped to memory devices (as opposed to I/O or peripheral devices including fixed and floppy disk drives and other I/O storage devices). The memory devices may generally include volatile memory such as random access memory (RAM), particularly dynamic random access memory (DRAM) such as synchronous DRAM (SDRAM). SDRAM may include double data rate (DDR) SDRAM, DDR2 SDRAM, DDR3 SDRAM, etc. Multiple memory devices may be incorporated into memory modules (e.g. single inline memory modules (SIMMs), dual inline modules (DIMMs), etc.).

The memory address spaces for different partitions may be generally logically distinct. That is, a numerical value of a particular address in the partition 10A may be mapped to a particular memory location in one of the memories 14A-14D. That same numerical value in the partition 10B may be mapped to a different memory location, e.g. in the memory 14E or another memory in the partition 10B. Similarly, that same numerical value in the partition 10C may be mapped to a memory location in the memory 14F or another memory in the partition 10C. More generally, a numerical value of a particular address may map to a different memory location in each logically distinct memory address space. Accordingly, as a general rule, a device in one partition 10A-10C may not address memory in another partition 10A-10C since that memory address would generally map to memory in the same partition. However, the system of FIG. 1 may also implement an address mapping feature in which address ranges within the memory address space of a partition can be mapped as message buffers. The message buffers may be used for communication between the partitions. Specifically, a message buffer may be assigned to each partition in the system. The memory locations for the message buffer may be implemented in that partition, and those numerical addresses in other partitions are not mapped to memory in the other partitions (or if they are mapped to memory, the memory locations are not used).

Software may use the message buffers to transmit messages between the partitions. Thus, the system may allow for rapid, memory-based communication between the partitions while retaining most of the address space logically distinct for each partition, in one embodiment.

In the illustrated embodiment, a distributed memory system is implemented in which each node (or at least each node in a subset of the nodes) in a partition is coupled to memory devices. Accordingly, a memory address map may be implemented in the node controllers of each node 12A-12F to map the memory address space to the memory devices at each node. For example, the memory address map 28A is illustrated in the node 12A and the memory address map 28B is illustrated in the node 12B. The memory address map comprises a plurality of entries, and maps ranges of the memory address space to node numbers. The node numbers may then be used to route communications among the nodes 12A-12D. An exemplary entry is illustrated in the memory address map 28A, including a base, a limit, and a node number (N#). The base and limit describe the address range that is mapped to the node number N# by the entry. The base is the lowest numerical address of the range, and the limit is the highest numerical address in the range. Alternatively, the limit may be the size of the range (and thus the highest numerical address may be the base address plus the limit). Other mechanisms for describing an address range may also be used. In one embodiment, there may be a maximum number of nodes in a partition and the node number need not be stored in the entries. Instead, there may be an entry for each possible node number in the partition, and the node number may be implicit in the entry. While the memory address map may be replicated at each node in the partition, the content of the memory address map may be the same in each node. Each node may also be programmable with its node number (e.g. the node number registers 34A and 34B in the nodes 12A-12B may be programmed with the node number, and other nodes 12C-12F may include similar node number registers).

In addition to providing entries to map the memory address space to the node numbers for the nodes 12A-12D, the address map 28A may include one or more additional entries. These entries may be similar to the illustrated entry, but may map message buffer address ranges to node numbers. The message buffer entries may map the address range to a node number that is not in the partition. The node numbers may be assigned to nodes 12A-12F uniquely across the partitions. That is, the node numbers are unique for each node in the system, regardless of which partition the node is in. Thus, the node numbers may be used to route a memory request (read/write) between partitions if the address of the request is in one of the message buffers.

In one embodiment, the nodes 12A-12F may implement a packet-based inter-node communication. In the present embodiment, the interface is implemented as sets of links between the node. Each link may include a pair of unidirectional transmission paths (one in each direction between the nodes) implemented as point to point wires. The clock for the transmission path may be forwarded with the transmitted data. There may be command wires and data wires. For example, the links may be HyperTransport™ (HT) links implementing the HT specification promulgated by the HyperTransport Consortium. The links may be operated in a cache coherent fashion for communication between nodes or in a noncoherent fashion for communication between a node and an I/O device (or the I/O hub 22A). It is noted that a packet to be transmitted from one node to another may pass through one or more intermediate nodes, depending on the topology of the interconnect.

The packets may include request packets for initiating transactions (e.g. memory read/write transactions), probe packets for maintaining cache coherency, and response packets for responding to probes and requests (and for indicating completion by the source/target of a transaction). Some packets may indicate data movement, and the data being moved may be included in the data movement packets. For example, write requests include data. Probe responses with modified data and read responses both include data. Thus, in general, a packet may include a command portion defining the packet, its source and destination nodes, etc. A packet may optionally include a data portion following the command portion. The data may be a cache block in size, for coherent cacheable operations, or may be smaller (e.g. for non-cacheable reads/writes). A block may be the unit of data for which coherence is maintained. That is, the block of data is treated as a unit for coherence purposed. Coherence state is maintained for the unit as a whole (and thus, if a byte is written in the block, then the entire block is considered modified, for example). A block may be a cache block, which is the unit of allocation or deallocation in the caches, or may differ in size from a cache block.

The node controller in each node 12A-12F may also include a routing table (e.g. the routing table 32A in the node 12A and the routing table 32B in the node 12B). The routing table may include an entry for each possible node number, and may indicate which interface circuit (and thus which link) the node is to transmit a packet on if the node that the packet is being transmitted to is that node number. In one embodiment, the packets travel in virtual channels to prevent deadlock in the system. There may be an interface circuit selection for each possible virtual channel for each possible node number.

For the illustrated embodiment, each node 12A-12D in the partition 10A is directly coupled to each other node 12A-12D. Accordingly, the routing table 32A may be programmed to route packets to each node number for a node in the partition 10A to the interface circuit that couples to that node. For the node numbers corresponding to nodes in other partitions 10B-10C, the routing table 32A may be programmed to route packets to a node that has an interface circuit coupled to a node in the other partition (e.g. the node 12C for the partition 10B and the node 12D for the partition 10C, in the example). Alternatively, packets to a given partition may be routed through one or more other partitions, and the routing table may programmed to route the packets to the node that is coupled to the first partition through which the packet is to be routed. Routing tables in the other partitions may be programmed to continue routing the packet to its destination. In other embodiments, fewer links may be connected between nodes and a packet may be routed to a destination through an intermediate node or nodes. In such an embodiment, the routing table may be programmed to route the packet to an intermediate node, which may have a routing table entry that routes the packet onward to another node or to the destination node. Thus, a routing table entry may generally select an interface circuit that will route the packet toward its destination node.

One mechanism for assigning the node numbers uniquely across the partitions may include defining a start node register for each partition (e.g. the register 30 in the node 12A). The start node register may be programmed with a start node number that is the initial node number to be assigned within the partition. Node numbers may be assigned beginning with the start node number and using consecutive node numbers above the start node number for other nodes. As mentioned above, each node 12A-12F may be programmable with its node number in a node number register 34A-34B. In other embodiments, pin ties, fuses, or other mechanisms of communicating a node number to a node may be used.

In one embodiment, the memory requests to the message buffers may be coherent requests. That is, the requests may be handled using the coherence protocol. In one embodiment, the message buffers may be defined to be non-cacheable. For example, memory type region registers, or MTRRs 36A-36B, illustrated in the processors 18A-18B may be used. An MTRR may be programmed with a memory address range and various attributes for the range, including its cacheability. By making the message buffers non-cacheable, coherence handling may be simplified (e.g. there are no cached copies of the message buffer locations, and thus probes may not be needed). Other embodiments may permit caching of the message buffer data. In such embodiments, routing for probes and probe responses across the partitions 10A-10C may be provided for in addition to routing of requests and responses.

The system may be configured at boot to perform the above operation within and between partitions. In one embodiment, since the partitions may each include multiple processors, a bootstrap processor (BSP) may be selected to configure the partition. Other processors may be referred to as application processors (APs). There may be one BSP per partition, in one embodiment. The BSP may be selected to be one of the processors in the node that is coupled to the I/O hub 22A that is further coupled to the south bridge 24A. In this case, for example, one of the processors 18A-18B in the node 12A may be selected, since the node 12A is coupled to the I/O hub 22A, which is coupled to the south bridge 24A. The south bridge 24A is coupled to the NVRAM 26A, which may store the boot code for the system. The boot code may comprise low level software that may be executed when a computer system is booted, to configure the system for operation. The boot code in this case is basic input/output system (BIOS) code 36A. A processor in the node 12E may be selected to be the BSP for partition 10B, since the node 12D is coupled to the I/O hub 22B, which is coupled to the south bridge 24A, which is coupled to the NVRAM 26B storing the BIOS code 36B. A BSP in the partition 10C may also be selected.

The BIOS code 36A-36B may be responsible for programming the routing tables and memory address maps within each partition, as well as initializing various other system resources. In one embodiment, static configuration information may also be stored in the NVRAM (e.g. configuration data 38A in the NVRAM 26A and configuration data 38B in the NVRAM 26B). The configuration data 38A-38B may describe, for example, the topology of the system, the node(s) and interface circuit(s) that are coupled to other partitions, etc. Alternatively, such data (or some of the data) may be discovered. For example, partition topology can be discovered by reading on each link to see if a device responds. Additional details of the configuration process are provided below.

In summary, during operation (after configuration by the BIOS code), a memory request may be issued by a source (e.g. a processor) in a node. The node controller may use the memory address map to determine a destination node number for the request. The node controller may use the destination node number and the routing table to identify the interface circuit over which the packet is to be transmitted, and may transmit the packet. There may be queuing in the node controller to queue requests at various points in the above process, in various embodiments.

The memory address maps and the routing tables may be implemented in any desired fashion. For example, the memory address map or routing table may comprise a plurality of registers, a memory array, etc. For programming purposes, the memory address map entries and routing table entries may be addressable as registers (e.g. registers in a configuration address space).

The nodes 12A-12F illustrated in FIG. 1 include processors, and may also be referred to as processing nodes. One or more processors may comprise a chip multiprocessing (CMP) or chip multithreaded (CMT) integrated circuit in the processing node or forming the processing node, or the processing node may have any other desired internal structure. Any level of integration or any number of discrete components may form a node. Other types of nodes may include any desired circuitry and the circuitry for communicating on the links. For example, the I/O devices may be I/O nodes, in one embodiment. Generally, a node may be treated as a unit for coherence purposes. Thus, the coherence state in the coherence scheme may be maintained on a per-node basis. Within the node, the location of a given coherent copy of the block may be maintained in any desired fashion, and there may be more than one copy of the block (e.g. in multiple cache levels within the node).

Generally, a processor 18A-18D may comprise circuitry that is designed to execute instructions defined in a given instruction set architecture. That is, the processor core circuitry may be configured to fetch, decode, execute, and store results of the instructions defined in the instruction set architecture. The processors 18A-18D may comprise any desired configurations, including superpipelined, superscalar, or combinations thereof. Other configurations may include scalar, pipelined, non-pipelined, etc. Various embodiments may employ out of order speculative execution or in order execution. The processor may include microcoding for one or more instructions or other functions, in combination with any of the above constructions. Various embodiments may implement a variety of other design features such as caches, translation lookaside buffers (TLBs), etc.

The interface circuits IF0 to IF3 in each node may comprise a variety of buffers and control circuitry for receiving packets from an HT link and for transmitting packets upon an HT link. In other embodiments, other links may be used.

The I/O hubs 22A-22B may comprise circuitry configured to interface to the node 12A or 12E (e.g. to communicate on the HT links, in one embodiment) and to communicate with various peripheral devices and/or interfaces. For example, the I/O hubs 22A-22B communicate with the south bridge 24A-24B. A peripheral component interconnect (PCI) bus may be used to communicate with the south bridge, for example. Other PCI devices may be coupled to the interconnect as well. The south bridge 24A-24B may provide connection for various legacy interfaces and/or low bandwidth interfaces (e.g. key board and mouse). Additionally, the south bridge 24A-24B may provide connection to the NVRAM 26A-26B. In some embodiments, the south bridge 24A-24B may also direct various system power management functions as well. Any peripheral devices may be included in a system. For example, the peripheral devices may include devices for communicating with another computer system to which the devices may be coupled (e.g. network interface cards or modems). Furthermore, the peripheral devices may include video accelerators, audio cards, hard or floppy disk drives or drive controllers, SCSI (Small Computer Systems Interface) adapters and telephony cards, sound cards, and a variety of data acquisition cards such as GPIB or field bus interface cards.

In one embodiment, each of the nodes 12A-12F may be a single integrated circuit chip comprising the circuitry shown therein in FIG. 1 and described above. That is, each node 12A-12F may be a chip multiprocessor (CMP). Other embodiments may implement the nodes 12A-12F as two or more separate integrated circuits, as desired. Any level of integration or discrete components may be used.

It is noted that, in various embodiments, the number of nodes in a partition may be varied from one to any desired number. Similarly, the number of processors and/or memory controllers in a node may be varied from one to any desired number, and the number of interface circuits may be varied from one to any desired number.

Figure 2:
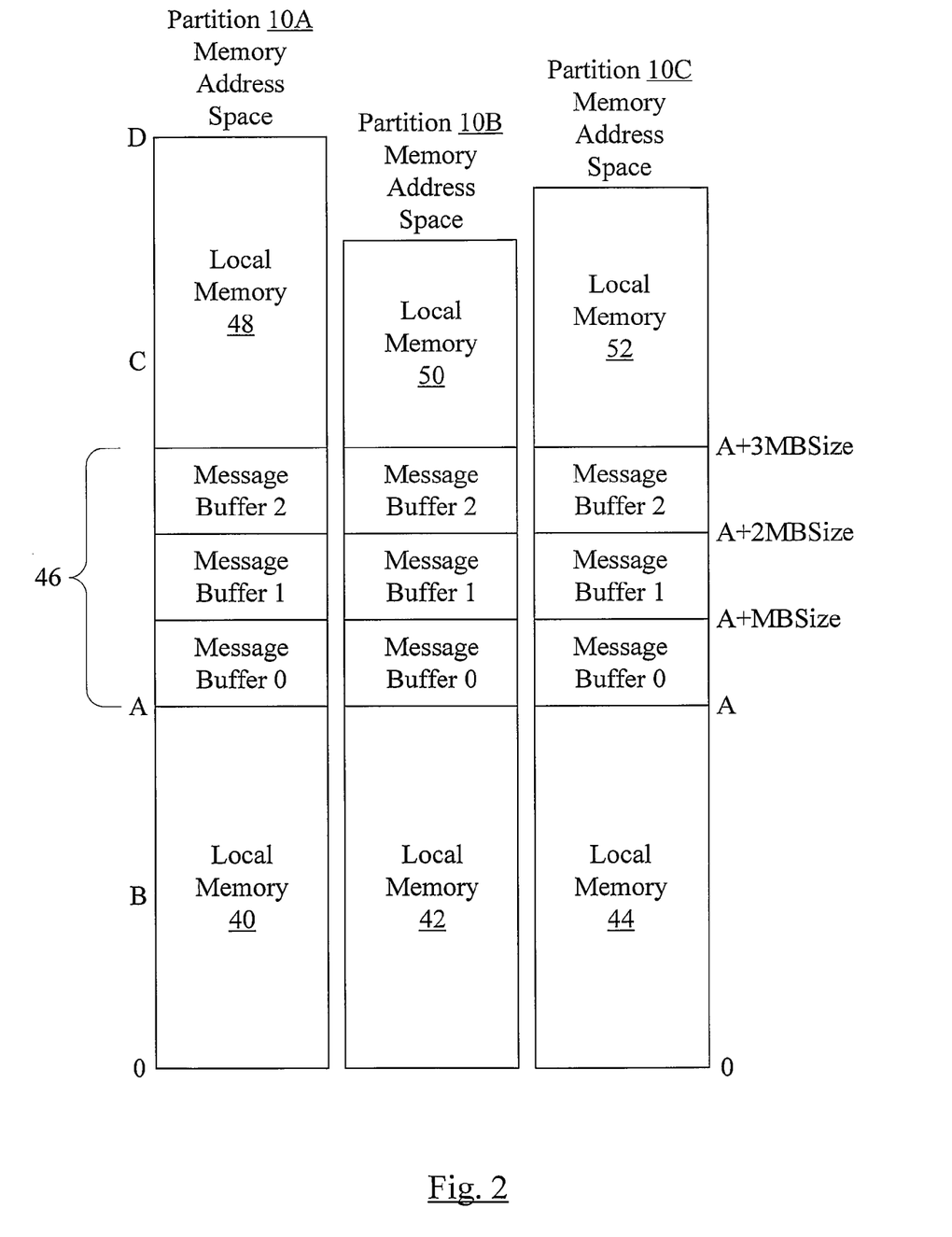
FIG. 2 is a diagram illustrating partition address spaces for one embodiment.

Turning now to FIG. 2, a block diagram illustrating one embodiment of partition memory address spaces is shown. The partition 10A memory address space, the partition 10B memory address space, and the partition 10C memory address space are shown, for a three partition system such as the one shown in FIG. 1. Other embodiments may have more or fewer partitions. Address zero is located at the bottom of FIG. 2, and increasing addresses occur in an upward direction on the address spaces as shown.

Each of the memory address spaces include a local memory portion between address 0 and address A (reference numerals 40, 42, and 44 for the partition 10A memory address space, the partition 10B memory address space, and the partition 10C memory address space, respectively). The local memory portions 40, 42, and 44 are mapped to local memory within each respective partitions (e.g. local memory portion 40 may be mapped to one or more of the memories 14A-14D in the partition 10A). The local memory portions 40, 42, and 44 may be mapped in any desired fashion, and need not be the same mapping in one partition as compared to another. Similarly, in this example, local memory portions 48, 50, and 52 corresponding to the partition 10A memory address space, the partition 10B memory address space, and the partition 10C memory address space, respectively, may be mapped to the local memory in each respective partition. It is noted that not all of the local memory portions need be mapped to memory. That is, there may be addresses or ranges of addresses in the local memory portions that are not mapped to any memory.

A message buffer section 46 begins at address A, and extends to address A plus 3 times the message buffer size (MBSize) in this embodiment, since there are three message buffers, one for each partition. Other embodiments may implement different numbers of message buffers for different numbers of partitions in a system. The local memory sections 48, 50, and 52 thus begin at memory address A+3 MBSize in this embodiment, and extend to the remaining partition memory address space for each partition.

As can be seen, the same numerical addresses in each partition memory address space are used for the message buffers. Thus, the addresses may require no modification as they are transmitted over the boundary from one partition to another (e.g. from the node 12C to the node 12E, or from the node 12D to the node 12F, or vice versa in FIG. 1). Additionally, software that uses the message buffers may be simplified since the same address values are used in any partition to address the message buffer of a given partition.

Message buffer 0 may correspond to the partition 10A, and thus the memory locations assigned to message buffer 0 (from address A to Address A+MBSize−1) may be mapped in partition 10A. The memory locations from address A+MBSize to address A+3 MBSize−1 may not be mapped to memory in partition 10A. Instead, these locations are mapped to node numbers for nodes in partitions 10B or 10C, depending on which buffer. Similarly, message buffer 1 may correspond to the partition 10B, and thus the memory locations assigned to message buffer 1 (from address A+MBSize to Address A+2 MBSize−1) may be mapped in partition 10B. The memory locations from address A to address A+MBSize−1 and address A+2 MBSize to address A+3 MBSize−1 may not be mapped to memory in partition 10B, but rather map to node numbers in partitions 10A and 10C. Message buffer 2 may correspond to the partition 10C, and thus the memory locations assigned to message buffer 2 (from address A+2 MBSize to Address A+3 MBSize−1) may be mapped in partition 10C. The memory locations from address A to address A+2 MBSize−1 may not be mapped to memory in partition 10C, but rather map to node numbers in partitions 10A and 10B.

The message buffers may generally be located anywhere in the memory address spaces of the partitions, up to the top of the smallest memory address space (e.g. up to the top of the partition 10B memory address space, in the embodiment of FIG. 2). The memory address spaces are not required to be the same size. If the memory address spaces are the same size, the message buffers may be allocated at the top of the memory address space of each partition.

The message buffers may be any size, in various embodiments. For example, each message buffer may be 16 megabytes, in one embodiment. Other message buffers may be larger or smaller. A message buffer may be equal in size to a page used for memory translation, or a multiple of the page size, in some embodiments.

It is noted that, in some embodiments, the message buffer in a given partition may map to more than one node (e.g. portions of the message buffer may be mapped to different nodes). In such a case, there may be multiple entries in the memory address map for subranges of the message buffer, and different node numbers may be provided for each subrange.

Figure 3:
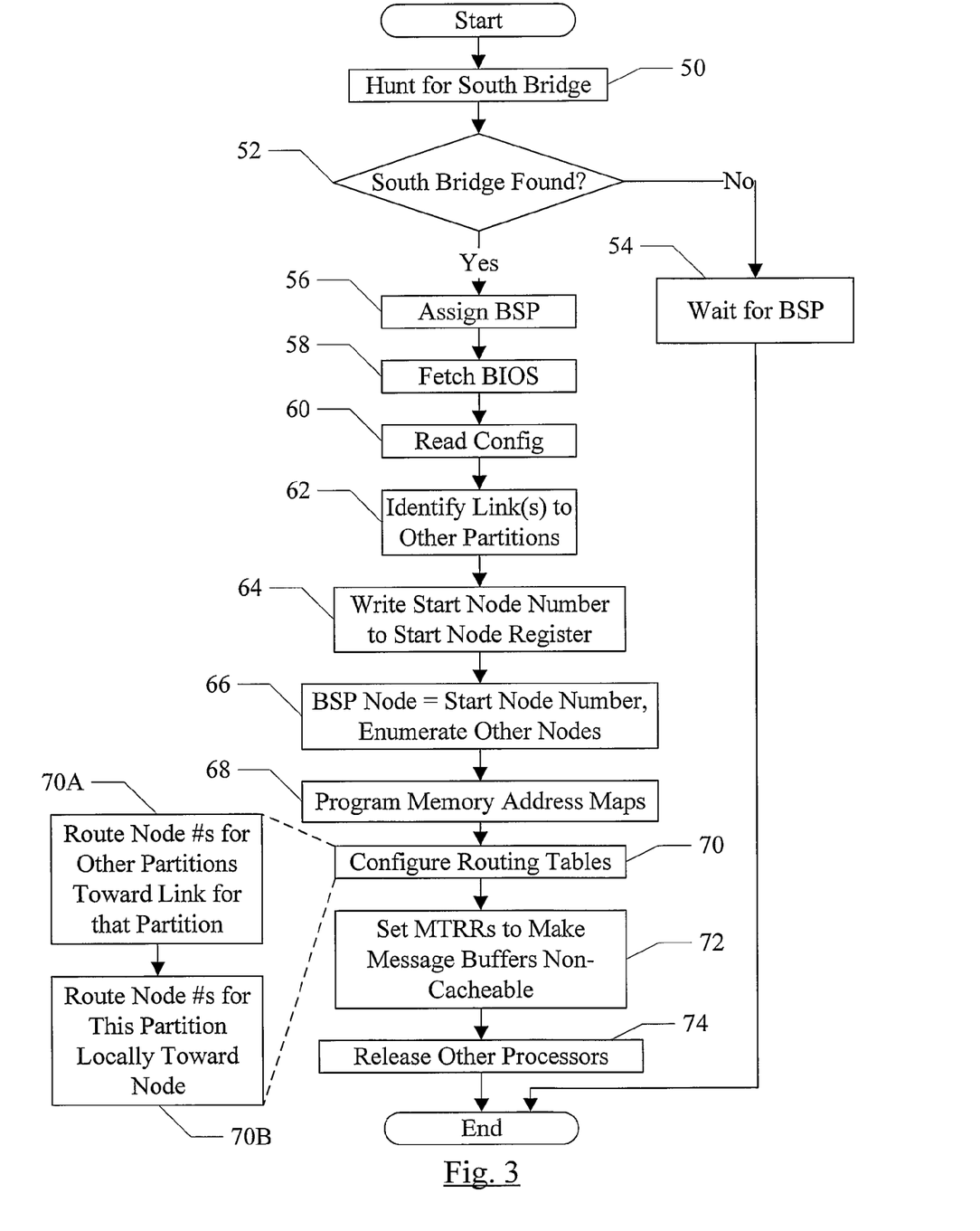
FIG. 3 is a flowchart illustrating operation of one embodiment of booting the system.

Turning next to FIG. 3, a flowchart is shown illustrating operation during one embodiment of booting in the system. At least a portion of the flowchart may be implemented in software instructions executed by one or more of the processors in the system. The software may comprise instructions executable by the processors to perform the operations described. While the blocks are illustrated in a particular order for ease of understanding, other orders may be used.

On boot, each node (or each processor) may "hunt for the south bridge" (block 50). This block may be implemented by hardware in the node controller, hardware in the processor, or software stored locally in a node and fetched by a processor. The hunt for south bridge may include issuing a read request via each interface circuit to a predefined address. In response to the request, an I/O hub may be configured to forward the request to determine if the south bridge responds. If a valid value is returned in response to the read, the south bridge has been located. Otherwise, a predetermined value (e.g. all binary ones) may be returned in response to the read to indicate that no south bridge has been found. If the south bridge is not found by a node/processor (decision block 52, "no" leg), the node/processor may wait for the boot strap processor (BSP) to release the other processors (block 54). For example, in one embodiment, each processor may have a request disable bit that prevents the processor from transmitting a request. The request disable bit may be set for each processor that does not receive find the south bridge.

If the south bridge is found (decision block 52, "yes" leg), a processor in the node may be assigned to be the BSP processor (block 56). The node controller may assign one of the processors to be the BSP if the node controller performs the hunt for south bridge. If the processors perform the hunt for south bridge, the processor that receives the valid read data in response may be assigned as the BSP. Other processors in the node may wait to be released by the BSP, similar to block 54.

The BSP may fetch the BIOS code from the NVRAM and begin executing the code (block 58). The remainder of the blocks describe below may be performed by the BSP executing the BIOS code. If configuration data is stored in the NVRAM, the code may read the configuration data (block 60). For example, the configuration data may include topology information, identification of which links are coupled to other partitions, etc., or any subset of the configuration information. Configuration information not stored in the NVRAM may be discovered using a discovery process (e.g. the size of memory attached to each node in the partition).

The BSP may identify the link(s) that couple the partition to other partitions (e.g. from the configuration file or through discovery) (block 62). Additionally, the BSP may write the start node number to the start node register (block 64). The start node number may be stored in the configuration data, or may be determined by communicating with the BSPs in other partitions. The BSP may assign its own node the start node number, and may enumerate the other nodes in the partition with consecutive node numbers that are greater than the start node number (block 66). This operation, completed by the BSP in each of the partitions, may ensure that a unique node number is assigned to each node in the system. That is, the node numbers may be unique across the system, even though the system includes multiple partitions.

The BSP may also program the memory address map (block 68). The BSP may discover the amount of memory attached to each node, and may program the memory address map to cover the nodes. Alternatively, the memory size and configuration may be included in the configuration data. Additionally, the BSP may determine the message buffer address range and may program the message buffer assigned to the current partition to memory attached to a node. The remainder of the address range may be mapped to the node (or nodes) in the other partition(s) that map the message buffer address ranges for those partitions. These node numbers may be part of the configuration data or may be determined with other BSPs in other partitions.

The BSP may configure the routing tables for the nodes in the partition, based on the connection of the links between the nodes and the links that couple to other partitions (block 70). Specifically, the node numbers that identify nodes in other partitions (not the current partition) may be routed toward the node having the link to that partition (block 70A). Node numbers within the partition may be routed locally within the partition, toward the node having that node number assigned (block 70B).

The BSP may program the MTRRs to indicate that the message buffer ranges are non-cacheable (block 72), and may release the other processors in the partition (block 74). For example, if a request disable bit is supported as described above, the BSP may clear the request disable bits.

The boot operations illustrated in FIG. 3 have to do with configuring the memory and the message buffers for interpartition communication. Numerous other boot-related configuration and operation may be implemented in various embodiments, before, during, and/or after the operation shown.

Figure 4:
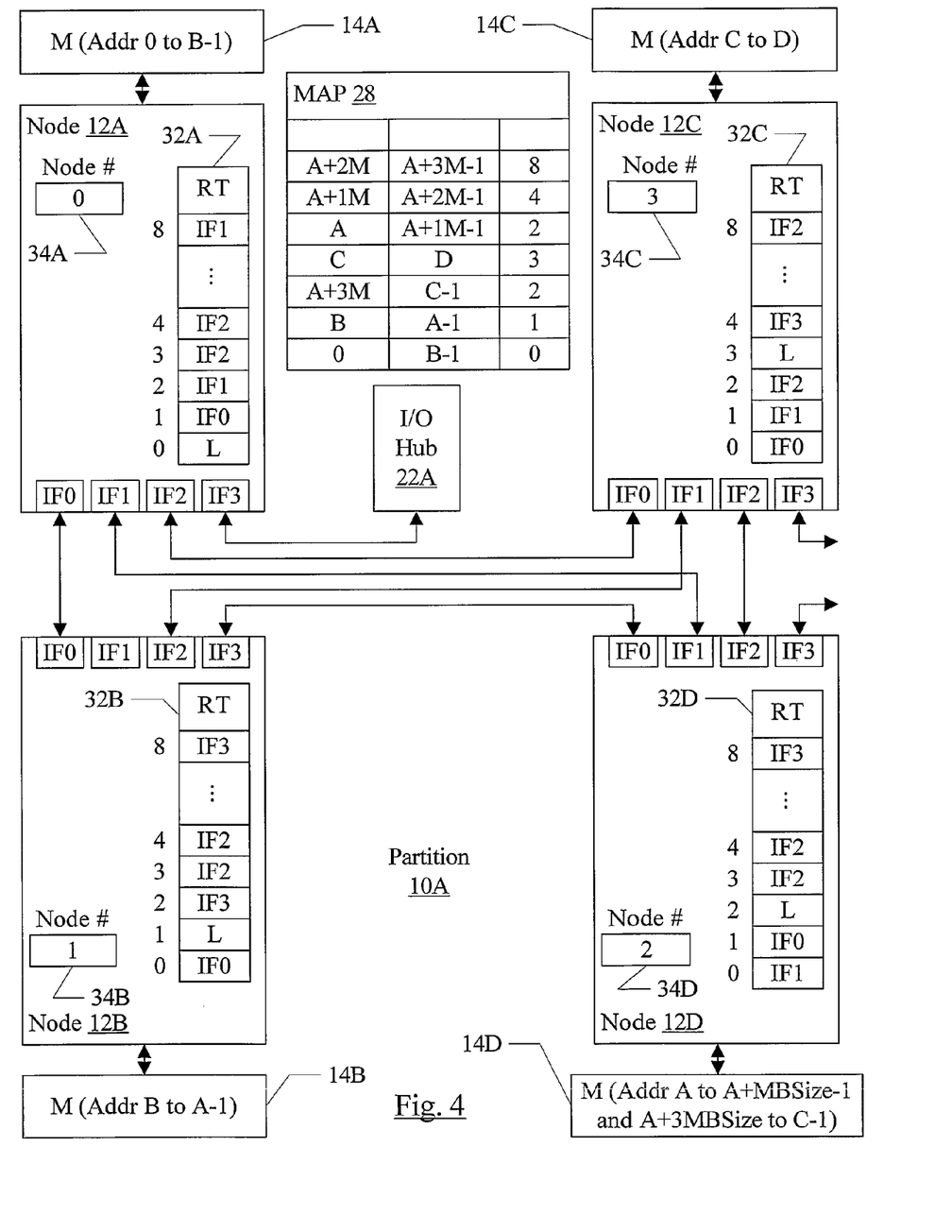
FIG. 4 is an example of a configured partition for one embodiment.

Turning next to FIG. 4, a block diagram is shown of one example of programming the memory map for the partition 10A of the system shown in FIG. 1 and the address space shown in FIG. 2. On the left side of the address space in FIG. 2 are letters representing addresses in the partition 10A memory address space. Specifically, the addresses "B", "A" (which matches A in other memory address spaces), "C", and "D" are all shown.

One copy of the memory address map 28 is shown, since it is the same in each node. In practice, each node 12A-12D may have its own copy of the memory address map 28. The nodes 12A-12D are shown, having node number registers 34A-34D, respectively, and routing tables 32A-32D, respectively. Each node has interface circuits IF0-IF3. The memories 14A-14D are shown, and the memory address ranges assigned to each memory are illustrated as well. Specifically, addresses 0 to B−1 are mapped to the memory 14A; addresses B to A−1 are mapped to memory 14B; addresses C to D are mapped to memory 14C; and addresses A to A+MBSize (the message buffer assigned to partition 10A) and A+3 MBSize to C−1 are mapped to the memory 14D. It is noted that address ranges may be mapped to memories in any desired fashion, FIG. 4 is merely one example.

The memory address map 28 thus maps the address range 0 to B−1 to node 0 (since node 12A is assigned node number 0 in the example, as illustrated in node number register 34A). Similarly address range B to A−1 is mapped to node 1 (since node 12B is assigned node number 1); address range A+3 MBSize (abbreviated A+3M in FIG. 4) to C−1 is mapped to node 2 (since node 12D is assigned node number 2); and address range C to D is mapped to node 3 (since node 12C is assigned node number 2). The memory address map also maps the message buffers to node numbers. Specifically, address range A to A+1MBSize−1 (abbreviated A+1M−1) is mapped to node 2 (which has the message buffer memory in this example). The address range A+1M to A+2 MBSize−1 (abbreviated A+2M−1) is mapped to node 4 (which is a node in the partition 10B in this example) and the address range A+2M to A+3M−1 is mapped to node 8 (which is a node in the partition 10C in this example).

The routing tables 32A-32D are also programmed in FIG. 4. The indications in the routing table entries include an "L" for local, if the node is the sink for a packet having that node number, or an interface circuit indication (IF0 to IF3). The actual encoding of routing table entries may take any form. The entries for each routing table entry are labeled in FIG. 4 to the left of the entry with the node number that corresponds to that entry.

Accordingly, the routing table 32A is programmed to route packets to node 0 locally within the node 12A (e.g. to the memory controller 16A, for a memory request, or to a processor 18A-18B, for a response). Packets to nodes 1-3 are routed on interfaces IF0 to IF2, respectively, to reach each node 12B, 12D, and 12C, as shown in FIG. 1. Packets to node 4 are routed on IF2 to the node 12C, which is coupled to the partition 10B. Packets to node 8 are routed on IF1 to the node 12D, which is coupled to the partition 10C. Note that the interface circuit IF3 is not used in the routing table 32A. The interface circuit IF3 is coupled to the I/O node 22A, and thus no memory is coupled to that node except the NVRAM. The routing table 32B is programmed to route packets to node 0 on IF0 to the node 12A; packets to node 1 locally in the node 12B; packets to node 2 on IF3 to the node 12D; packets to nodes 3 and 4 on IF2 to the node 12C; and packets to node 8 on IF3 to the node 12D. In this case, IF1 is not used because there is no link coupled to IF1. The routing table 32C is programmed to route packets to node 0 on IF0 to the node 12A; packets to node 1 on IF1 to the node 12B; packets to node 2 on IF2 to the node 12D; packets to nodes 3 locally in the node 12C; packets to node 4 on IF3 to the partition 10B; and packets to node 8 on IF2 to the node 12D. The routing table 32D is programmed to route packets to node 0 on IF1 to the node 12A; packets to node 1 on IF0 to the node 12B; packets to node 2 locally in the node 12D; packets to nodes 3 and 4 on IF2 to the node 12C; and packets to node 8 on IF3 to the partition 10C.

As mentioned previously, other embodiments may not have a direct link between all nodes in a given partition. In such embodiments, routing tables may be programmed to route a packet to a non-directly connected node to an intermediate node, which may subsequently route the packet on to another intermediate node or the destination node.

The NVRAMs shown in FIG. 1 may be one example of a computer accessible storage medium that may store boot code. The computer accessible storage medium may take other forms in other embodiments. Generally speaking, a computer accessible storage medium may include any media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Numerous variations and modifications will become apparent to those skilled in the art once the above disclosure is fully appreciated. It is intended that the following claims be interpreted to embrace all such variations and modifications.

What is claimed is:

1. A method comprising:
assigning a unique node number to each node of a first plurality of nodes in a first partition of a system and to each node of a second plurality of nodes in a second partition of the system, wherein each node of the first plurality of nodes and the second plurality of nodes is uniquely identified by its assigned node number, and wherein a first memory address space spans first memory included in the first partition and a second memory address space spans second memory included in the second partition, wherein the first memory address space and the second memory address space are generally logically distinct;
programming a first address map in the first partition to map the first memory address space to node numbers, wherein the programming comprises mapping a first memory address range within the first memory address space to a first node number assigned to a first node of the second plurality of nodes in the second partition, whereby the first memory address range is mapped to the second partition;
programming a second address map in the second partition to map the second memory address space to node numbers, wherein the programming comprises mapping a second memory address range within the second memory address space to a second node number assigned to a second node of the first plurality of nodes in the first partition, whereby the second memory address range is mapped to the first partition; and
programming a third address map in a third partition to map a third memory address space that spans third memory in the third partition to node numbers, wherein the programming comprises mapping the second memory address range within the third memory address space to a fourth node number assigned to a fourth node of the first plurality of nodes in the first partition, whereby the second memory address range is mapped to the first partition; and
wherein the third partition comprises a third plurality of nodes, wherein programming the first address map further comprises mapping a third memory address range within the first memory address space to a third node number assigned to a third node of the third plurality of nodes in the third partition, whereby the third memory address range is mapped to the third partition.

2. The method as recited in claim 1 wherein each node of the first plurality of nodes comprises a plurality of interface circuits, and wherein each interface circuit of the plurality of interface circuits is configured to couple to a respective link, and wherein the links interconnect the first plurality of nodes, and wherein a second node of the first plurality of nodes has a first interface circuit coupled to a first link that is coupled to a second interface circuit of the first node of the second plurality of nodes, and wherein each node of the first plurality of nodes comprises a routing table configured to map a destination node number of a packet to one of the plurality of interface circuits in that node that is coupled to the link on which the packet is to be transmitted, and wherein the method further comprises programming the routing table of the second node to route a packet having the first node number as a destination node to the first interface circuit to be transmitted to the first node in the second partition.

3. The method as recited in claim 1 wherein memory operations within the first partition are coherent, and wherein communications in the first memory address range are coherent between the first and second partitions.

4. The method as recited in claim 1 further comprising programming the first memory address range to be non-cacheable.

5. The method as recited in claim 1 further comprising writing a start node number to a start node register in the first partition, the start node number being an initial node number to be used in the first partition.

6. The method as recited in claim 5 further comprising enumerating the first plurality of nodes with node numbers beginning with the start node number.

7. The method as recited in claim 1 further comprising
issuing a request having a first address in the first memory range from one of the first plurality of nodes;
mapping the first address to the first node number; and
routing the request to the first node in the second partition.

8. A computer accessible storage medium comprising a plurality of instructions which, when executed in a boot strap processor in a node of a first plurality of nodes in a first partition of a computer system that includes a second partition comprising a second plurality of nodes and a third partition comprising a third plurality of nodes:
assign a unique node number to each node of the first plurality of nodes in the first partition and each node of the second plurality of nodes in the second partition, wherein each node of the first plurality of nodes and the second plurality of nodes is uniquely identified by its assigned node number, and wherein a first memory address space spans first memory included in the first partition, a second memory address space spans second memory included in the second partition, and a third memory address space spans third memory in the third partition, wherein the first memory address space and the second memory address space are generally logically distinct;
program a first address map in the first partition to map the first memory address space to node numbers, wherein the programming comprises mapping a first memory address range within the first memory address space to a first node number assigned to a first node of the second plurality of nodes in the second partition, whereby the first memory address range is mapped to the second partition;
program a second address map in the second partition to map the second memo address space to node numbers, wherein the programming comprises mapping a second memory address range within the second memory address space to a second node number assigned to a second node of the first plurality of nodes in the first partition, whereby the second memory address range is mapped to the first partition; and program a third address map to map the third memory address space to node numbers, wherein the programming comprises mapping the second memory address range within the third memory address space to a third node number assigned to a third node of the first plurality of nodes in the first partition, whereby the second memory address range is mapped to the first partition.

9. The computer accessible storage medium as recited in claim 8 wherein each node of the first plurality of nodes comprises a plurality of interface circuits, and wherein each interface circuit of the plurality of interface circuits is configured to couple to a respective link, and wherein the links interconnect the first plurality of nodes, and wherein a second node of the first plurality of nodes has a first interface circuit coupled to a first link that is coupled to a second interface circuit of the first node of the second plurality of nodes, and wherein each node of the first plurality of nodes comprises a routing table configured to map a destination node number of a packet to one of the plurality of interface circuits in that node that is coupled to the link on which the packet is to be transmitted, and wherein the instructions, when executed, program the routing table of the second node to route a packet having the first node number as a destination node to the first interface circuit to be transmitted to the first node in the second partition.

10. A system comprising:
a first partition comprising a first plurality of nodes and first memory, wherein a first memory address space spans first memory included in the first partition;
a second partition comprising a second plurality of nodes and second memory, wherein a second memory address space spans second memory included in the second partition, and wherein the first memory address space and the second memory address space are generally logically distinct;
wherein each node of the first plurality of nodes comprises a plurality of interface circuits configured to couple to links, wherein the links interconnect the first plurality of nodes, and wherein a second node of the first plurality of nodes has a first interface circuit coupled to a first link that is coupled to a second interface circuit of the first node, and wherein each of the first plurality of nodes comprises a routing table configured to map a destination node number of a packet to one of the plurality of interface circuits on which that packet is to be transmitted, and wherein the routing table of the second node is programmed during use to route a packet having the first node number as a destination node to the first interface circuit; and
input/output (I/O) circuitry including a non-volatile memory that stores boot code, wherein the I/O circuitry is coupled to one of the links to one of the first plurality of nodes, and wherein a first processor in the one of the first plurality of nodes is assigned to be a boot strap processor to execute the boot code and configure the first partition;
wherein each of the first plurality of nodes and the second plurality of nodes are assigned unique node numbers during use;
wherein the first partition includes a first address map to map the first memory address space to node numbers, wherein the first address map is programmable to map a first memory address range within the first memory address space to a first node number assigned to a first node of the second plurality of nodes in the second partition, whereby the first memory address range is mapped to the second partition.

11. The system as recited in claim 10 wherein the second partition comprises a second address map to map the second memory address space to node numbers, wherein the second address map is programmable to map a second memory address range within the second memory address space to a second node number assigned to a second node of the first plurality of nodes in the first partition, whereby the second memory address range is mapped to the first partition.

12. The system as recited in claim 10 wherein the I/O circuitry comprises an I/O hub coupled to the link and a south bridge coupled to the I/O hub, wherein the non-volatile memory is coupled to the south bridge.

13. The system as recited in claim 10 wherein the first partition comprises a start node register configured to store a start node number, and wherein the first plurality of nodes are enumerated, during use, with node numbers beginning with the start node number.

14. The system as recited in claim 10 wherein one of the first plurality of nodes is configured to issue a request having a first address in the first memory range, and wherein the one of the plurality of nodes is configured to map the first address to the first node number, and wherein the first plurality of nodes are configured to route the request to the first node in the second partition.

15. A system comprising:
- a first partition comprising a first node, a second node, a third node, and first memory, wherein a first memory address space spans the first memory;
- a second partition comprising a fourth node and a second memory, wherein a second memory address space spans the second memory; and
- a third partition comprising a fifth node and a third memory, wherein a third memory address space spans the third memory, and wherein the first memory address space, the second memory address space, and the third memory address space are generally logically distinct;
- wherein the first node, the second node, the third node, the fourth node, and the fifth node are assigned unique node numbers during use;
- wherein the first node in the first partition is coupled to a first plurality of links, and wherein a first link of the first plurality of links is coupled to the fourth node in the second partition;
- wherein the second node in the first partition is coupled to a second plurality of links, and wherein a second link of the second plurality of links is coupled to the fifth node in the third partition;
- wherein the first partition includes a first address map to map the first memory address space to node numbers, wherein the first address map is programmable to map a first memory address range within the first memory address space to a first node number assigned to the fourth node, whereby the first memory address range is mapped to the second partition, and wherein the first address map is programmable to map a second memory address range within the first memory address space to a second node number assigned to the fifth node, whereby the second memory address range is mapped to the third partition;
- wherein the second partition includes a second address map to map the second memory address space to node numbers, wherein the second address map is programmable to map a third memory address range within the second memory address space to a third node number assigned to the first node, whereby the third memory address range is mapped to the first partition; and
- wherein the third address map is programmable to map the third memory address range within the third memory address space to a fourth node number assigned to the second node, whereby the third memory address range is mapped to the first partition.

16. The system as recited in claim 15 further comprising input/output (I/O) circuitry including a non-volatile memory that stores boot code, wherein the I/O circuitry is coupled to one of the links to one of the first, second, or third nodes, and wherein a first processor in the one of the first, second, or third nodes is assigned to be a boot strap processor to execute the boot code and configure the first partition.

17. The system as recited in claim 15 wherein the third node is configured to assign the second node number to a packet having an address in the second address range, and wherein the third node is configured to transmit the packet to the second node responsive to the second node number, and wherein the second node is configured to transmit the packet to the fifth node responsive to the second node number.

18. The system as recited in claim 15 wherein the first memory address range and the third memory address range are coherent between the first partition and the second partition, and wherein the second memory address range and the fourth memory address range are coherent between the first partition and the third partition.

19. The system as recited in claim 15 wherein the second partition further comprises a sixth node and the third partition further comprises a seventh node, wherein the sixth node is coupled to a link to which the seventh node is coupled.

* * * * *

UNITED STATES PATENT AND TRADEMARK OFFICE
CERTIFICATE OF CORRECTION

| | | |
|---|---|---|
| PATENT NO. | : 7,882,327 B2 | |
| APPLICATION NO. | : 11/831102 | |
| DATED | : February 1, 2011 | |
| INVENTOR(S) | : Vydhyanathan Kalyanasundharam et al. | |

It is certified that error appears in the above-identified patent and that said Letters Patent is hereby corrected as shown below:

Claim 8, col. 13, line 61, after "map the second", please delete "memo" and insert --memory-- in place thereof.

Signed and Sealed this
Third Day of May, 2011

David J. Kappos
*Director of the United States Patent and Trademark Office*